US011480859B2

(12) United States Patent
Arakawa

(10) Patent No.: US 11,480,859 B2
(45) Date of Patent: Oct. 25, 2022

(54) PHOSPHOR, WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Osamu Arakawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 313 days.

(21) Appl. No.: 16/792,935

(22) Filed: Feb. 18, 2020

(65) Prior Publication Data

US 2020/0264499 A1 Aug. 20, 2020

(30) Foreign Application Priority Data

Feb. 19, 2019 (JP) .............................. JP2019-027428
Jul. 8, 2019 (JP) .............................. JP2019-127038

(51) Int. Cl.
*G03B 21/20* (2006.01)
*C09K 11/02* (2006.01)
*C09K 11/77* (2006.01)
*G03B 33/12* (2006.01)

(52) U.S. Cl.
CPC ............ *G03B 21/204* (2013.01); *C09K 11/02* (2013.01); *C09K 11/7774* (2013.01); *G03B 33/12* (2013.01)

(58) Field of Classification Search
None
See application file for complete search history.

(56) References Cited

U.S. PATENT DOCUMENTS

2015/0276177 A1* 10/2015 Maeda ............... G03B 21/2066
353/84

FOREIGN PATENT DOCUMENTS

| JP | 2004161807 A | * | 6/2004 | ......... C09K 11/0883 |
| JP | 2014-181288 A | | 9/2014 | |
| JP | 2014181288 A | * | 9/2014 | |
| JP | 2016-204561 A | | 12/2016 | |

* cited by examiner

*Primary Examiner* — Michelle M Iacoletti
*Assistant Examiner* — Danell L Owens
(74) *Attorney, Agent, or Firm* — Dority & Manning, P.A.

(57) ABSTRACT

A phosphor according to the present disclosure includes a first crystal phase added with an activator agent, a second crystal phase higher in thermal conductivity than the first crystal phase, and a third crystal phase which is disposed between the first crystal phase and the second crystal phase, and is same in crystal structure as the first crystal phase, and is smaller in additive amount of the activator agent than the first crystal phase.

20 Claims, 4 Drawing Sheets

PHOSPHOR, WAVELENGTH CONVERSION ELEMENT, LIGHT SOURCE DEVICE, AND PROJECTOR

The present application is based on, and claims priority from JP Application Serial Number 2019-027428, filed Feb. 19, 2019 and JP Application Serial Number 2019-127038, filed Jul. 8, 2019, the disclosure of which is hereby incorporated by reference herein in its entirety.

BACKGROUND

1. Technical Field

The present disclosure relates to a phosphor, a wavelength conversion element, a light source device, and a projector.

2. Related Art

As a light source device used for a projector, there is proposed a light source using fluorescence emitted from a phosphor when irradiating the phosphor with excitation light emitted from a light source. When the phosphor is irradiated with the excitation light, the temperature of the phosphor rises due to absorption of the excitation light. However, in the phosphor, there occurs a phenomenon called thermal quenching that the light emission efficiency drops due to the rise in temperature to decrease an amount of fluorescence emitted.

As a measure for preventing the thermal quenching, there is proposed a phosphor improved in radiation performance by increasing the thermal conductivity of the phosphor itself. In JP-A-2016-204561 (Document 1), there is disclosed a phosphor provided with a ceramics matrix made of alumina, and YAG phosphor particles dispersed in the ceramics matrix and doped with Ce as an activator agent. Since the thermal conductivity of alumina is higher than the thermal conductivity of YAG, the phosphor described above is higher in radiation performance than a phosphor made of YAG alone.

However, due to considerations by the inventors, it has been found out that it is not achievable for the phosphor according to Document 1 to obtain high light emission efficiency.

SUMMARY

A phosphor according to an aspect of the present disclosure includes a first crystal phase added with an activator agent, a second crystal phase higher in thermal conductivity than the first crystal phase, and a third crystal phase which is disposed between the first crystal phase and the second crystal phase, and is same in crystal structure as the first crystal phase, and is smaller in additive amount of the activator agent than the first crystal phase.

In the phosphor according to the aspect of the present disclosure, the second crystal phase may be different in crystal structure from the first crystal phase and the third crystal phase.

In the phosphor according to the aspect of the present disclosure, the third crystal phase may fail to be added with the activator agent.

In the phosphor according to the aspect of the present disclosure, the first crystal phase may include an oxide phosphor, and the second crystal phase may include a metal oxide.

In the phosphor according to the aspect of the present disclosure, the oxide phosphor may include at least one of $Y_3Al_5O_{12}$, $Y_3(Al,Ga)_5O_{12}$, $Lu_3Al_5O_{12}$, and $TbAl_5O_{12}$.

In the phosphor according to the aspect of the present disclosure, the metal oxide may include at least one of $Al_2O_3$, $MgO$, $ZnO$, $TiO_2$, $Y_2O_3$, $YAlO_3$, $BeO$, and $MgAl_2O_4$.

In the phosphor according to the aspect of the present disclosure, the first crystal phase may include a nitride phosphor, and the second crystal phase may include a metal nitride.

In the phosphor according to the aspect of the present disclosure, the activator agent to be added to the first crystal phase may include at least either one of Ce and Eu.

In the phosphor according to the aspect of the present disclosure, thermal conductivity of a constituent material of the second crystal phase may be no lower than 10 W/m·K.

A wavelength conversion element according to an aspect of the present disclosure includes a phosphor layer including the phosphor according to the aspect of the present disclosure, and a base member provided with the phosphor layer.

A light source device according to an aspect of the present disclosure includes the wavelength conversion element according to the aspect of the present disclosure, and a light source configured to emit excitation light to the wavelength conversion element.

A projector according to an aspect of the present disclosure includes the light source device according to the aspect of the present disclosure, a light modulation device configured to modulate light from the light source device in accordance with image information to thereby form image light, and a projection optical device configured to project the image light.

DESCRIPTION OF EXEMPLARY EMBODIMENTS

First Embodiment

A first embodiment of the present disclosure will hereinafter be described using FIG. 1 and FIG. 2.

It should be noted that in each of the drawings described below, the constituents are shown with the scale ratios of respective sizes set differently between the constituents in some cases in order to facilitate the visualization of each of the constituents.

An example of a projector according to the present embodiment will be described.

The projector according to the present embodiment is a projection-type image display device for displaying a color picture on a screen (a projection target surface). The projector is provided with three light modulation devices corresponding respectively to colored light, namely red light, green light, and blue light. The projector is provided with semiconductor lasers with which high-intensity and high-power light can be obtained as light sources for emitting excitation light.

Figure 1:
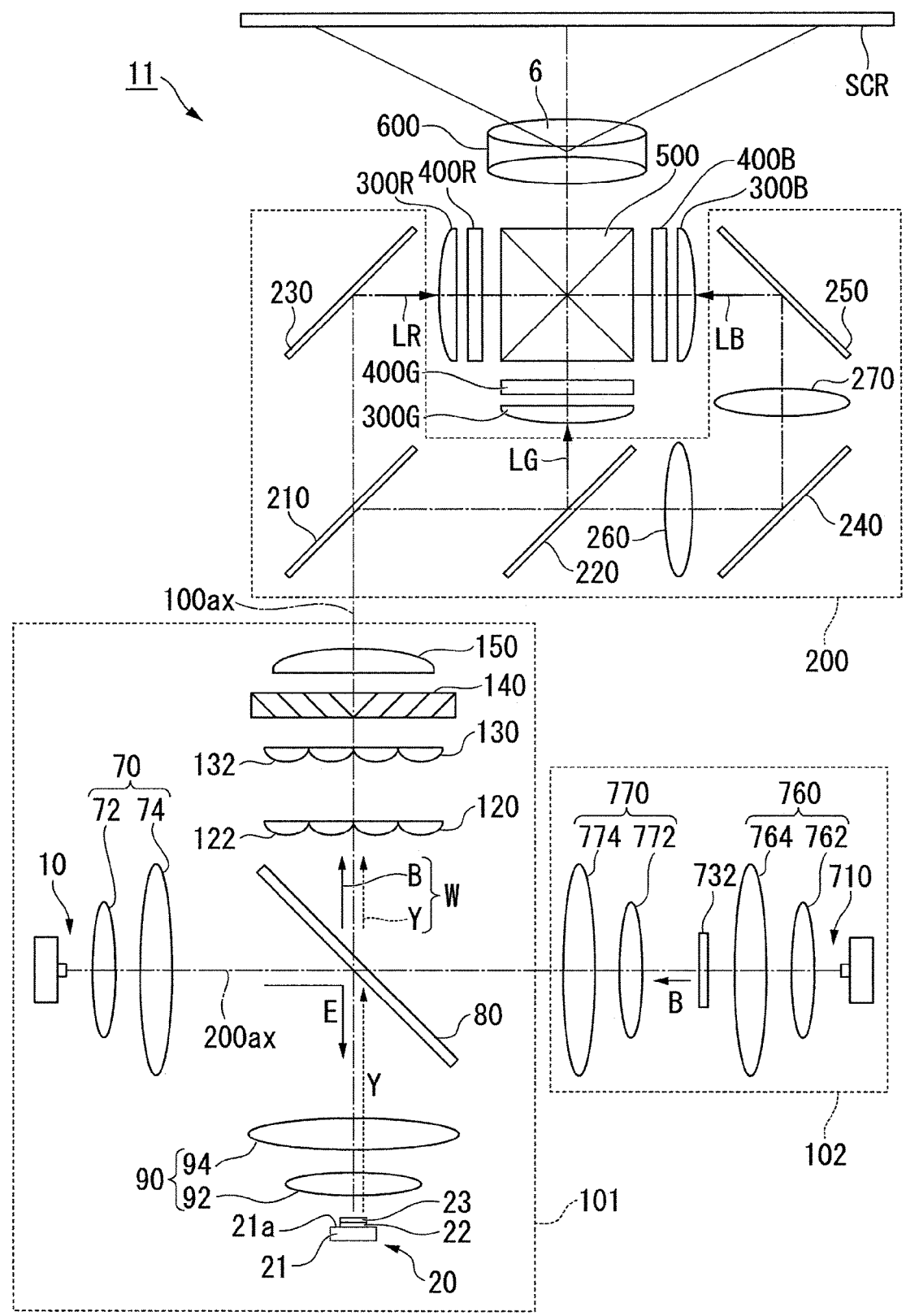
FIG. 1 is a schematic configuration diagram of a projector according to a first embodiment.

FIG. 1 is a schematic configuration diagram showing an optical system of the projector 11 according to the present embodiment.

As shown in FIG. 1, the projector 11 according to the present embodiment is provided with a first light source device 101, a second light source device 102, a color separation light guide optical system 200, the light modulation device 400R, the light modulation device 400G, the light modulation device 400B, a light combining element 500, and a projection optical device 600. The first light source device 100 according to the present embodiment corresponds to a light source device in the appended claims.

The first light source device 100 is provided with a first light source 10, a collimating optical system 70, a dichroic mirror 80, a collimating light collection optical system 90, a wavelength conversion element 20, a first lens array 120, a second lens array 130, a polarization conversion element 140, and a superimposing lens 150.

The first light source 10 is formed of a semiconductor laser for emitting blue excitation light E in a first wavelength band. The excitation light E has the wavelength in a range of, for example, 440 through 450 nm, and the peak wavelength of the emission intensity is, for example, 445 nm. It is possible for the first light source 10 to be formed of a single semiconductor laser, or to be formed of a plurality of semiconductor lasers. The first light source 10 is disposed so that the light axis 200$ax$ of the laser beam emitted from the first light source 10 is perpendicular to an illumination light axis 100$ax$. It should be noted that as the first light source 10, it is also possible to use a semiconductor laser for emitting the excitation light having a peak wavelength other than 445 nm, for example, a peak wavelength of 460 nm. The first light source 10 emits the excitation light E toward the wavelength conversion element 32. The first light source 10 according to the present embodiment corresponds to a light source in the appended claims.

The collimating optical system 70 is provided with a first lens 72 and a second lens 74. The collimating optical system 70 substantially collimates the light emitted from the first light source 10. The first lens 72 and the second lens 74 are each formed of a convex lens.

The dichroic mirror 80 is disposed in a light path between the collimating optical system 70 and the collimating light collection optical system 90 in a posture of crossing each of the light axis 200$ax$ of the first light source 10 and the illumination light axis 100$ax$ at an angle of 45°. The dichroic mirror 80 reflects the excitation light E consisting of a blue light component, and transmits fluorescence Y as yellow light including a red light component and a green light component.

The collimating light collection optical system 90 makes the excitation light E having been transmitted through the dichroic mirror 80 converge to enter a phosphor layer 23 of the wavelength conversion element 20, and at the same time substantially collimates the fluorescence Y emitted from the wavelength conversion element 20. The collimating light collection optical system 90 is provided with a first lens 92 and a second lens 94. The first lens 92 and the second lens 94 are each formed of a convex lens.

The second light source device 102 is provided with a second light source device 710, a light collection optical system 760, a diffuser plate 732, and a collimating optical system 770.

The second light source 710 is formed of a semiconductor laser having the same wavelength band as that of the first light source 10 of the first light source device 101. It is possible for the second light source 710 to be formed of a single semiconductor laser, or to be formed of a plurality of semiconductor lasers. Further, it is also possible for the second light source 710 to be formed of a semiconductor laser different in wavelength band from the semiconductor laser of the first light source 10.

The light collection optical system 760 is provided with a first lens 762 and a second lens 764. The blue light B emitted from the second light source 710 is converged by the light collection optical system 760 on a diffusion surface of the diffuser plate 732 or in the vicinity of the diffuser plate 732. The first lens 762 and the second lens 764 are each formed of a convex lens.

The diffuser plate 732 diffuses the blue light B emitted from the second light source 710 to thereby generate the blue light B having a light distribution similar to the light distribution of the fluorescence Y having been emitted from the wavelength conversion element 20. As the diffuser plate 732, there can be used, for example, obscured glass made of optical glass.

The collimating optical system 770 is provided with a first lens 772 and a second lens 774. The collimating optical system 770 substantially collimates the light emitted from the diffuser plate 732. The first lens 772 and the second lens 774 are each formed of a convex lens.

The blue light B having been emitted from the second light source device 102 is reflected by the dichroic mirror 80, and then combined with the fluorescence Y having been emitted from the wavelength conversion element 20 and then transmitted through the dichroic mirror 80 to thereby turn to white light W. The white light W enters the first lens array 120. The detailed configuration of the wavelength conversion element 20 will be described later.

The first lens array 120 has a plurality of first lenses 122. The first lens array 120 divides the light emitted from the dichroic mirror 80 into a plurality of partial light beams. The plurality of first lenses 122 is arranged in a matrix in a plane perpendicular to the illumination light axis 100$ax$.

The second lens array 130 has a plurality of second lenses 132 corresponding respectively to the plurality of first lenses 122 of the first lens array 120. The second lens array 130 forms the image of each of the first lenses 122 constituting the first lens array 120 in the vicinity of the image forming area of each of the light modulation device 400R, the light modulation device 400G, and the light modulation device 400B in cooperation with the superimposing lens 150 located in the posterior stage. The plurality of second lenses 132 is arranged in a matrix in a plane perpendicular to the illumination light axis 100$ax$.

The plurality of partial light beams divided into by the first lens array 120 is converted by the polarization conversion element 140 into linearly-polarized light beams uniformed in the polarization direction.

The partial light beams emitted from the polarization conversion element 140 are converged by the superimposing lens 150 and are superimposed on each other in the vicinity of the image forming area of each of the light modulation device 400R, the light modulation device 400G, and the light modulation device 400B. The first lens array 120, the second lens array 130, and the superimposing lens 150 constitute an integrator optical system for homogenizing the intensity distribution in the illumination target plane of the light emitted from the wavelength conversion element 20.

The color separation light guide optical system 200 is provided with a first dichroic mirror 210, a second dichroic mirror 220, a reflecting mirror 230, a reflecting mirror 240, a reflecting mirror 250, a relay lens 260, and a relay lens 270. The color separation light guide optical system 200 separates the white light W obtained from the first light source device 101 and the second light source device 102 into the red light LR, the green light LG, and the blue light LB, and then guides the red light LR, the green light LG, and the blue light LB to the corresponding light modulation devices 400R, 400G, and 400B.

A field lens 300R is disposed between the color separation light guide optical system 200 and the light modulation device 400R. A field lens 300G is disposed between the color separation light guide optical system 200 and the light modulation device 400G. A field lens 300B is disposed between the color separation light guide optical system 200 and the light modulation device 400B.

The first dichroic mirror 210 transmits the red light component and reflects the green light component and the blue light component. The second dichroic mirror 220 reflects the green light component, and transmits the blue light component. The reflecting mirror 230 reflects the red light component. The reflecting mirror 240 and the reflecting mirror 250 reflect the blue light component.

The red light LR having been transmitted through the first dichroic mirror 210 is reflected by the reflecting mirror 230, and is then transmitted through the field lens 300R to enter the image forming area of the light modulation device 400R for the red light. The green light LG having been reflected by the first dichroic mirror 210 is further reflected by the second dichroic mirror 220, then transmitted through the field lens 300G, and then enters the image forming area of the light modulation device 400G for the green light. The blue light LB having been transmitted through the second dichroic mirror 220 enters the image forming area of the light modulation device 400B for the blue light via the relay lens 260, the reflecting mirror 240 on the incident side, the relay lens 270, the reflecting mirror 250 on the exit side, and the field lens 300B.

The light modulation device 400R, the light modulation device 400G, and the light modulation device 400B each modulate the colored light as the incident light in accordance with image information to thereby form image light. The light modulation device 400R, the light modulation device 400G, and the light modulation device 400B are each formed of a liquid crystal light valve. Although not shown in the drawings, on the light incident side of each of the light modulation device 400R, the light modulation device 400G, and the light modulation device 400B, there is disposed an incident side polarization plate. On the light exit side of each of the light modulation device 400R, the light modulation device 400G, and the light modulation device 400B, there is disposed an exit side polarization plate.

The light combining element 500 combines the image light emitted from the light modulation device 400R, the image light emitted from the light modulation device 400G, and the image light emitted from the light modulation device 400B with each other to form full-color image light. The light combining element 500 is formed of a cross dichroic prism having four rectangular prisms bonded to each other to have a substantially square shape in the plan view. On the boundary surfaces having a substantially X shape on which the rectangular prisms are bonded to each other, there are formed dielectric multilayer films.

The image light having been emitted from the light combining element 500 is projected by the projection optical system 600 in an enlarged manner to form an image on the screen SCR. In other words, the projection optical device 600 projects the light modulated by the light modulation device 400R, the light modulated by the light modulation device 400G, and the light modulated by the light modulation device 400B. The projection optical device 600 is formed of a plurality of projection lenses 6.

The wavelength conversion element 20 will hereinafter be described.

As shown in FIG. 1, the wavelength conversion element 20 is provided with a base member 21, a reflecting layer 22, and a phosphor layer 23. The base member 21 is formed of metal such as aluminum. The reflecting layer 22 is disposed on a first surface 21a of the base member 21, and is formed of a metal film made of, for example, silver.

Figure 2:
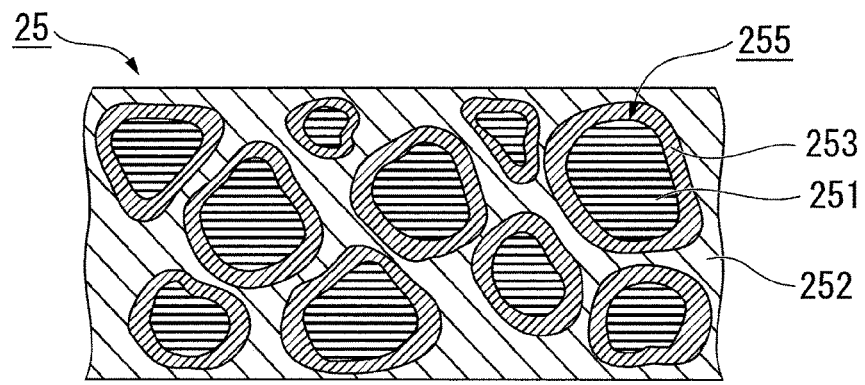
FIG. 2 is a schematic diagram showing a cross-sectional structure of a phosphor according to the first embodiment.

FIG. 2 is a schematic diagram showing a cross-sectional structure of a phosphor 25 constituting the phosphor layer 23.

As shown in FIG. 2, the phosphor 25 according to the present embodiment is formed of three crystal phases including a first crystal phase 251, a second crystal phase 252, and a third crystal phase 253.

The first crystal phase 251 includes an oxide phosphor added with an activator agent. The first crystal phase 251 is formed of a plurality of phosphor particles 255. The first crystal phase 251 includes, for example, yttrium aluminum garnet added with cerium (Ce) as the activator agent (YAG $(Y_3Al_5O_{12})$:Ce). In other words, the first crystal phase 251 has a garnet structure as the crystal structure.

Citing YAG:Ce as an example, as the phosphor particles 255, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The oxide phosphor constituting the first crystal phase 251 can include at least one of $Y_3(Al,Ga)_5O_{12}$, $Lu_3Al_5O_{12}$, and $TbAl_5O_{12}$ besides $Y_3Al_5O_{12}$. Further, it is possible for the first crystal phase 251 to include europium (Eu) instead of cerium (Ce) as the activator agent.

The second crystal phase 252 is disposed on the periphery of the first crystal phase 251, and functions as a binder for combining the plurality of phosphor particles 255 with each other. The second crystal phase 252 is formed of a material including a metal oxide such as alumina ($Al_2O_3$). The second crystal phase 252 has a corundum structure as the crystal structure.

The second crystal phase 252 has higher thermal conductivity than that of the first crystal phase 251. For example, the thermal conductivity of alumina forming the second crystal phase 252 is about 30 W/m·K, and the thermal conductivity of YAG forming the first crystal phase 251 is about 12 W/m·K. Therefore, the second crystal phase 252 has a different crystal structure from that of the first crystal phase 251, and at the same time, has higher thermal conductivity than that of the first crystal phase 251. It is desirable for the thermal conductivity of the constituent material of the second crystal phase 252 to be no lower than 10 W/m·K.

The metal oxide constituting the second crystal phase 252 can include at least one of MgO, ZnO, $TiO_2$, $Y_2O_3$, $YAlO_3$, BeO, and $MgAl_2O_4$ besides $Al_2O_3$ described above.

The thermal conductivity of MgO is about 45 W/m·K, the thermal conductivity of ZnO is about 25 W/m·K, the thermal conductivity of $TiO_2$ is about 43 W/m·K, the thermal conductivity of $Y_2O_3$ is about 27 W/m·K, the thermal conductivity of $YAlO_3$ is about 12 W/m·K, the thermal conductivity of BeO is about 250 W/m·K, the thermal conductivity of $MgAl_2O_4$ is about 14 W/m·K. Since the thermal conductivity of YAG is about 12 W/m·K, it is not possible to use $YAlO_3$ and YAG in combination, but when combining $YAlO_3$ with the oxide phosphor lower in thermal conductivity than YAG, it is possible to use $YAlO_3$.

The third crystal phase 253 is disposed between the first crystal phase 251 and the second crystal phase 252. Specifically, the third crystal phase 253 is disposed so as to cover a surface of one phosphor particle 255 constituting the first crystal phase 251. The third crystal phase 253 includes, for example, yttrium aluminum garnet (YAG ($Y_3Al_5O_{12}$) smaller in additive amount of the activator agent than the first crystal phase 251. In the case of the present embodiment, the additive amount of the activator agent is zero. In other words, the third crystal phase 253 includes yttrium aluminum garnet added with no activator agent (YAG ($Y_3Al_5O_{12}$)). As described above, the third crystal phase 253 has the same garnet structure as that of the first crystal phase 251 as the crystal structure.

It should be noted that in FIG. 2, the surfaces of all of the phosphor particles 255 constituting the first crystal phase 251 are covered one by one with the third crystal phase 253, but it is also possible for the first crystal phase 251 and the second crystal phase 252 to have direct contact with each other in some places without disposing the third crystal phase 253 on a part of the surface of some of the phosphor particles, for example.

The phosphor 25 having the configuration described above can be manufactured with, for example, the following processes.

First Process

A given amount of $Al_2O_3$ powder, a given amount of $Y_2O_3$ powder, and a given amount of $CeO_2$ powder as the raw powders of YAG:Ce and a given amount of ethanol are mixed with each other, and then ball milling is performed in a pot to form a slurry. The slurry is dried, then defatted after granulation, and is then sintered to obtain the YAG:Ce powder.

Second Process

A given amount of YAG:Ce powder obtained in the first process, a given amount of $Al_2O_3$ powder and a given amount of $Y_2O_3$ as the raw powders of YAG, and a given amount of ethanol are mixed with each other, and then ball milling is performed in a pot to form a slurry. Subsequently, the slurry is dried, then defatted after granulation, and is then sintered to obtain the powder having the periphery of YAG:Ce covered with YAG.

Third Process

A given amount of the powder obtained in the second process, a given amount of $Al_2O_3$ powder and a given amount of ethanol are mixed with each other, and then ball milling is performed in a pot to form a slurry. Subsequently, the slurry is dried and then granulated, and by performing shaping, defatting, and sintering in series, it is possible to obtain the phosphor 25 according to the present embodiment formed of a composite sintered body of YAG:Ce, YAG and almina.

In the present embodiment, since the first crystal phase 251 is formed of the oxide phosphor, and the second crystal phase 252 is formed of the metal oxide, an unwanted reduction reaction or the like does not occur in each of the crystal phases, and thus, the phosphor can stably be manufactured.

Functions and advantages of the phosphor 25 according to the present embodiment will hereinafter be described.

Firstly, a phosphor according to a comparative example will be described.

The inventers manufactured the phosphor according to the comparative example by way of trial with the following processes.

First Process

A given amount of $Al_2O_3$ powder, a given amount of $Y_2O_3$ powder, and a given amount of $CeO_2$ powder as the raw powders of YAG:Ce and a given amount of ethanol are mixed with each other, and then ball milling is performed in a pot to form a slurry. Subsequently, the slurry was dried, then defatted after granulation, and was then sintered to obtain the YAG:Ce powder.

Second Process

A given amount of YAG:Ce powder obtained in the first process and the $Al_2O_3$ powder are mixed with each other in a dry condition. Subsequently, the mixture is shaped, defatted, and then sintered to thereby obtain the phosphor according to the comparative example formed of a composite sintered body of YAG:Ce and alumina.

Figure 6:
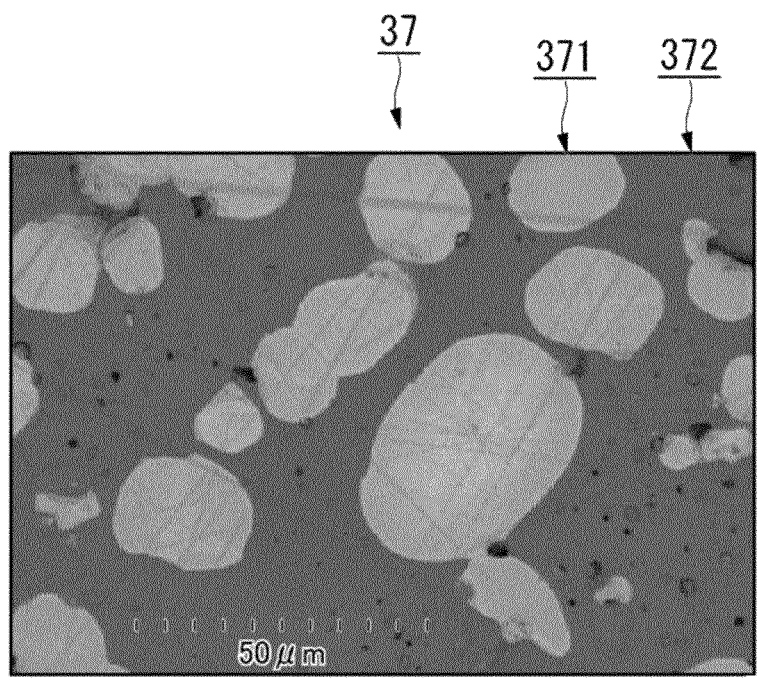
FIG. 6 is a diagram showing an electron micrograph of a cross-sectional surface of a phosphor according to a comparative example.

FIG. 6 is a diagram showing an electron micrograph of a cross-sectional surface of the phosphor 37 according to the comparative example.

It is found out that a plurality of phosphor particles 371 formed of YAG:Ce is included inside the binder 372 made of alumina in the phosphor 37 according to the comparative example as shown in FIG. 6.

The inventors measured the quantum efficiency as an index representing the emission efficiency using a measuring instrument with respect to the phosphor 37 according to the comparative example. As described above, since the thermal conductivity of alumina is higher than the thermal conductivity of YAG, the thermal conductivity of the phosphor according to the comparative example becomes higher than the thermal conductivity of the phosphor formed of YAG:Ce alone. As a result, in the phosphor according to the comparative example, it was expected that the rise in temperature was suppressed compared to the phosphor formed of YAG:Ce alone, and the thermal quenching was suppressed, and as a result, the emission efficiency was improved. However, the quantum efficiency of the phosphor 37 according to the comparative example degraded compared to the quantum efficiency of the phosphor formed of YAG:Ce alone, and the intended quantum efficiency failed to be obtained.

The inventors infer that the difference in crystal structure between YAG and alumina is the cause of failing to obtain the intended quantum efficiency in the phosphor 37 according to the comparative example. Specifically, since the crystal structure of alumina is the corundum structure while the crystal structure of YAG is the garnet structure, unconformity in crystal structure occurs on the interface where YAG and alumina have contact with each other. It is inferable that as a result, many crystal defects occur on the surface of the YAG particle which should essentially make a sufficient contribution to the light emission, and some of the excitation light is absorbed by the crystal defects, and as a result, the excitation light to be absorbed by the activator agent decreases, and thus the quantum efficiency degrades.

In contrast, in the phosphor 25 according to the present embodiment, since the surface of the first crystal phase 251 formed of YAG:Ce is covered with the third crystal phase 253 having the same crystal structure, the unconformity in crystal structure is difficult to occur, it is possible to reduce the crystal defects in the interface between the first crystal phase 251 and the third crystal phase 253. In contrast, since the second crystal phase 252 and the third crystal phase 253 are different in crystal structure from each other, it is conceivable that many crystal defects occurs on the surface of the second crystal phase 252. However, the second crystal phase 252 is not originally added with the activator agent, and does not make a contribution to the light emission, even when the crystal defects occurs in the second crystal phase 252, a harmful influence of the crystal defects to the light emission can significantly be reduced. Thus, according to the phosphor 25 related to the present embodiment, the quantum efficiency is improved compared to the phosphor according to the comparative example, and thus, it is possible to improve the emission efficiency.

Further, in the present embodiment, since the phosphor 25 described above is used, it is possible to provide the wavelength conversion element 20 high in emission efficiency.

Further, in the present embodiment, since the wavelength conversion element 20 described above is used, it is possible to provide the first light source device 101 high in emission efficiency.

Further, in the present embodiment, since the first light source device 101 described above is used, it is possible to provide the projector 11 excellent in display quality.

Second Embodiment

The second embodiment of the present disclosure will hereinafter be described using FIG. 3.

A projector according to the second embodiment is substantially the same in configuration as that of the first embodiment, but is different in the configuration of the phosphor from that of the first embodiment. Therefore, the description of the whole of the projector and the wavelength conversion element will be omitted.

Figure 3:
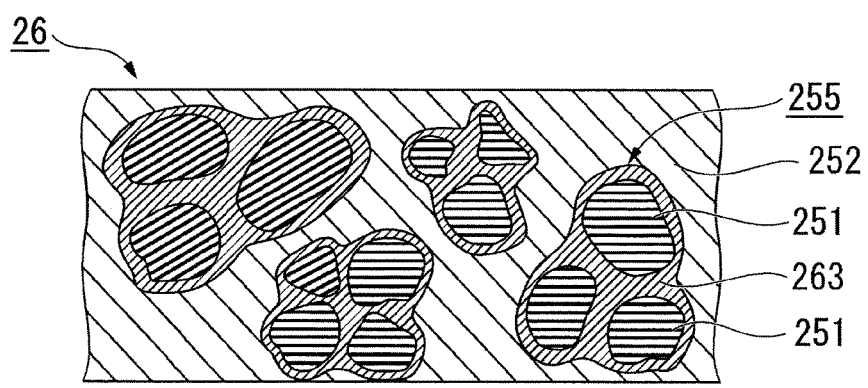
FIG. 3 is a schematic diagram showing a cross-sectional structure of a phosphor according to a second embodiment.

FIG. 3 is a schematic diagram showing a cross-sectional surface of a phosphor 26 according to the second embodiment.

In FIG. 3, the constituents common to FIG. 2 of the first embodiment are denoted by the same reference symbols, and the detailed description thereof will be omitted.

As shown in FIG. 3, the phosphor 26 is formed of three crystal phases including the first crystal phase 251, the second crystal phase 252, and a third crystal phase 263. The third crystal phase 263 is disposed between the first crystal phase 251 and the second crystal phase 252. In the present embodiment, unlike the first embodiment, the third crystal phase 263 is disposed so as to cover a plurality of phosphor particles 255 constituting the first crystal phase 251 in a lump.

In FIG. 3, the surfaces of all of the phosphor particles 255 constituting the first crystal phase 251 are covered with the third crystal phase 263, but, for example, an area not covered with the third crystal phase 263 can exist in a part of the surface of some of the phosphor particles 255, and it is also possible for the first crystal phase 251 and the second crystal phase 252 to have direct contact with each other in that area. Further, the number of the phosphor particles 255 included in a single piece of the third crystal phase 263 is not particularly limited. Further, it is also possible for the third crystal phase 263 in the second embodiment for covering the plurality of phosphor particles 255 in a lump, and the third crystal phase 253 in the first embodiment for covering a single phosphor particle 255 to exist in the phosphor in a mixed manner.

The rest of the configuration of the wavelength conversion element 20 is substantially the same as in the first embodiment.

Also in the present embodiment, it is possible to obtain substantially the same advantages as in the first embodiment such as the advantage that it is possible to provide the phosphor 26, the wavelength conversion element 20, and the first light source device 101 high in emission efficiency, and the advantage that it is possible to provide the projector 11 excellent in display quality.

Third Embodiment

A third embodiment of the present disclosure will hereinafter be described using FIG. 4.

A projector according to the third embodiment is substantially the same in configuration as that of the first embodiment, but is different in the configuration of the phosphor from that of the first embodiment. Therefore, the description of the whole of the projector and the wavelength conversion element will be omitted.

Figure 4:
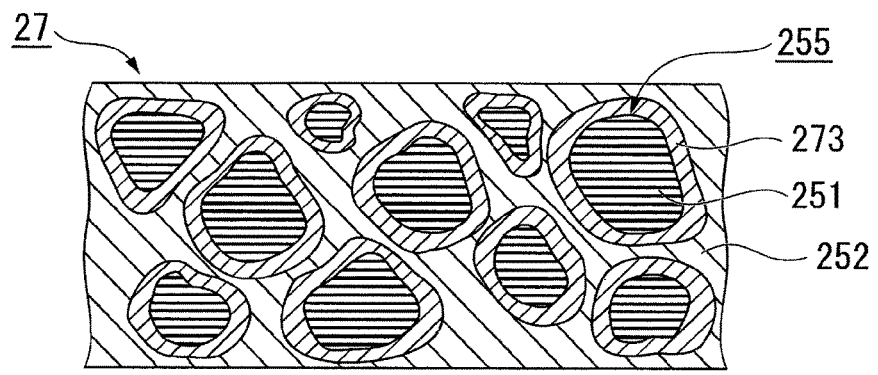
FIG. 4 is a schematic diagram showing a cross-sectional structure of a phosphor according to a third embodiment.

FIG. 4 is a schematic diagram showing a cross-sectional surface of a phosphor 27 according to the third embodiment.

In FIG. 4, the constituents common to FIG. 2 of the first embodiment are denoted by the same reference symbols, and the detailed description thereof will be omitted.

As shown in FIG. 4, the phosphor 27 is formed of three crystal phases including the first crystal phase 251, the second crystal phase 252, and a third crystal phase 273. The third crystal phase 273 is disposed between the first crystal phase 251 and the second crystal phase 252. In the present embodiment, unlike the first embodiment, the third crystal phase 273 includes yttrium aluminum garnet (YAG) including the activator agent. It should be noted that the additive amount of the activator agent in the third crystal phase 273 is smaller than the additive amount of the activator agent in the first crystal phase 251.

In FIG. 3, the surfaces of all of the phosphor particles 255 constituting the first crystal phase 251 are covered with the third crystal phase 273, but, for example, an area not covered with the third crystal phase 273 can exist in a part of the surface of some of the phosphor particles 255, and it is also possible for the first crystal phase 251 and the second crystal phase 252 to have direct contact with each other in that area.

The rest of the configuration of the wavelength conversion element 20 is substantially the same as in the first embodiment.

In the case of the present embodiment, although the third crystal phase 273 includes the activator agent, the additive amount of the activator agent of the third crystal phase 273 is smaller than the additive amount of the activator agent of the first crystal phase 251, and therefore, the harmful influence of the crystal defects on the light emission can be reduced compared to the phosphor according to the comparative example not provided with the third crystal phase. Thus, according to the phosphor 27 related to the present embodiment, it is possible to improve the emission efficiency compared to the phosphor according to the comparative example.

As described above, also in the present embodiment, it is possible to obtain substantially the same advantages as in the first embodiment such as the advantage that it is possible to provide the phosphor 27, the wavelength conversion element 20, and the first light source device 101 high in emission efficiency, and the advantage that it is possible to provide the projector 11 excellent in display quality.

Fourth Embodiment

A fourth embodiment of the present disclosure will hereinafter be described using FIG. 5.

A projector according to the fourth embodiment is substantially the same in schematic configuration as that of the first embodiment, but is different in the configuration of the wavelength conversion device from that of the first embodiment. Therefore, the description of the whole of the projector will be omitted.

Figure 5:
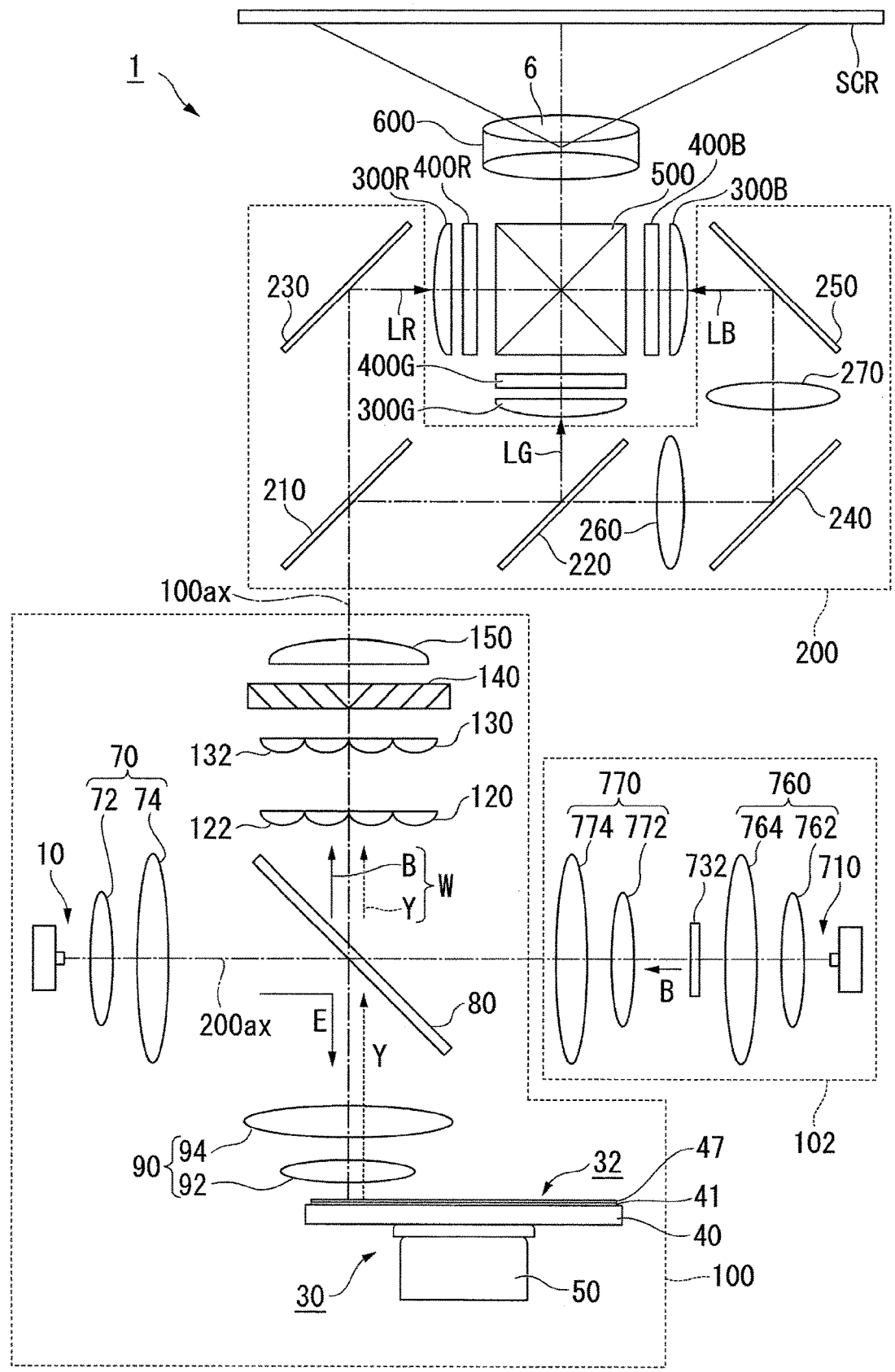
FIG. 5 is a schematic configuration diagram of a projector according to a fourth embodiment.

FIG. 5 is a schematic configuration diagram of the projector 1 according to the fourth embodiment.

In FIG. 5, the constituents common to those shown in FIG. 1 are denoted by the same reference symbols, and the description thereof will be omitted.

As shown in FIG. 5, the first light source device 100 according to the present embodiment is provided with the first light source 10, the collimating optical system 70, the dichroic mirror 80, the collimating light collection optical system 90, a wavelength conversion device 30, the first lens array 120, the second lens array 130, the polarization conversion element 140, and the superimposing lens 150.

The wavelength conversion element 30 is provided with a wavelength conversion element 32 and a motor 50 (a rotary device). The wavelength conversion element 32 is provided with a base member 40, a reflecting layer 41, and a phosphor layer 47. The phosphor layer 47 is constituted by any one of the phosphors 25, 26, and 27 according to the first through third embodiments.

The wavelength conversion element 32 is made rotatable around a rotational axis 35. The motor 50 rotates the wavelength conversion element 32 around the rotational axis 35. Therefore, the excitation light E emitted from the first light source 10 enters the wavelength conversion element 32 in a rotating state.

When the excitation light E has entered the phosphor layer 47, heat is generated in the phosphor layer 47. In the present embodiment, by rotating the wavelength conversion element 32 with the motor 50, the incident position of the excitation light E in the phosphor layer 47 is moved temporally. Thus, it is possible to prevent the phosphor layer 47 from being deteriorated by always irradiating the same position of the phosphor layer 47 with the excitation light E to thereby locally heat only a part of the phosphor layer 47.

In the case of the present embodiment, since the phosphors 25, 26, and 27 include the second crystal phase 252 made of a material such as alumina high in thermal conductivity in addition to the fact that the wavelength conversion element 32 rotates, the radiation performance can further be improved compared to the wavelength conversion element according to the comparative example not including the second crystal phase.

Also in the present embodiment, it is possible to obtain substantially the same advantages as in the first embodiment such as the advantage that it is possible to provide the phosphors 25, 26, and 27, the wavelength conversion element 32, and the first light source device 100 high in emission efficiency, and the advantage that it is possible to provide the projector 1 excellent in display quality.

It should be noted that the scope of the present disclosure is not limited to the embodiments described above, but a variety of modifications can be provided thereto within the scope or the spirit of the present disclosure.

For example, in the phosphor according to the embodiments described above, the first crystal phase includes the oxide phosphor, and the second crystal phase includes the metal oxide. Instead of this configuration, it is also possible for the first crystal phase to include a nitride phosphor, and for the second crystal phase to include a metal nitride. As the nitride phosphor, it is possible to use a sialon phosphor such as α-SiALON or β-SiALON. As the metal nitride, it is possible to use, for example, AlN. The thermal conductivity of AlN is about 255 W/m·K. When the first crystal phase includes the nitride phosphor and the second crystal phase includes the metal nitride as described above, an unwanted reduction reaction or the like does not occur in each of the crystal phases, and thus, the phosphor can stably be manufactured.

Alternatively, it is also possible for the first crystal phase to include an oxynitride phosphor, and for the second crystal phase to include a metal oxynitride. As the oxynitride phosphor, it is possible to use, for example, an LSN phosphor, and LYSN phosphor, a CASN phosphor, and a SCASN phosphor.

Besides the above, the specific descriptions of the shape, the number, the arrangement, the material, the manufacturing method, and so on of each of the constituents of the phosphor, the wavelength conversion element, the light source device, and the projector are not limited to those of the embodiments described above, but can arbitrarily be modified. Although in the above embodiments, there is described the example of installing the light source device according to the present disclosure in the projector using the liquid crystal light valves, the example is not a limitation. For example, it is also possible to implement the light source device according to the present disclosure in a projector using digital micromirror devices as the light modulation devices.

Although in each of the embodiments described above, there is described the example of installing the illumination device according to the present disclosure in the projector, the example is not a limitation. The illumination device according to the present disclosure can also be applied to lighting equipment, a headlight of a vehicle, and so on.

What is claimed is:

1. A phosphor comprising:
a first crystal phase added with an activator agent;
a second crystal phase higher in thermal conductivity than the first crystal phase; and
a third crystal phase which is disposed between the first crystal phase and the second crystal phase, and is same in crystal structure as the first crystal phase, and is smaller in additive amount of the activator agent than the first crystal phase,
wherein at least one phosphor particle constituting the first crystal phase is covered with the third crystal phase so there is no direct contact with the second crystal phase.

2. The phosphor according to claim 1; wherein
the second crystal phase is different in crystal structure from the first crystal phase and the third crystal phase.

3. The phosphor according to claim 2, wherein
there is no activator agent added to the third crystal phase.

4. The phosphor according to claim 3, wherein
the first crystal phase includes an oxide phosphor, and the second crystal phase includes a metal oxide.

5. The phosphor according to claim 2, wherein
the first crystal phase includes an oxide phosphor, and the second crystal phase includes a metal oxide.

6. The phosphor according to claim 2, wherein
the first crystal phase includes a nitride phosphor, and
the second crystal phase includes a metal nitride.

7. The phosphor according to claim 1; wherein
there is no activator agent added to the third crystal phase.

8. The phosphor according to claim 7, wherein
the first crystal phase includes an oxide phosphor, and
the second crystal phase includes a metal oxide.

9. The phosphor according to claim 7, wherein
the first crystal phase includes a nitride phosphor, and
the second crystal phase includes a metal nitride.

10. The phosphor according to claim 1, wherein
the first crystal phase includes an oxide phosphor, and
the second crystal phase includes a metal oxide.

11. The phosphor according to claim 10, wherein
the oxide phosphor includes at least one of $Y_3Al_5O_{12}$, $Y_3(Al,Ga)_5O_{12}$, $Lu_3Al_5O_{12}$, and $TbAl_5O_{12}$.

12. The phosphor according to claim 10, wherein
the metal oxide includes at least one of $Al_2O_3$, $MgO$, $ZnO$, $TiO_2$, $Y_2O_3$, $YAlO_3$, $BeO$, and $MgAl_2O_4$.

13. The phosphor according to claim 1, wherein
the first crystal phase includes a nitride phosphor, and
the second crystal phase includes a metal nitride.

14. The phosphor according to claim 1, wherein
the activator agent added to the first crystal phase includes at least either one of Ce and Eu.

15. The phosphor according to claim 1, wherein
thermal conductivity of a constituent material of the second crystal phase is no lower than 10 W/m·K.

16. A wavelength conversion element comprising:
a phosphor layer including the phosphor according to claim 1; and
a base member provided with the phosphor layer.

17. A light source device comprising:
the wavelength conversion element according to claim 16; and
a light source configured to emit excitation light to the wavelength conversion element.

18. A projector comprising:
the light source device according to claim 17;
a light modulation device configured to modulate light from the light source device in accordance with image information to thereby form image light; and
a projection optical device configured to project the image light.

19. The phosphor according to claim 1, wherein a respective plurality of phosphor particles constituting the first crystal phase are covered with the third crystal phase so there is no direct contact with the second crystal phase.

20. The phosphor according to claim 1, wherein a lump of a plurality of phosphor particles constituting the first crystal phase are collectively covered with a single piece of the third crystal phase so there is no direct contact with the second crystal phase.

* * * * *